United States Patent
Le Sage (10) Patent No.: US 9,046,601 B2
(45) Date of Patent: Jun. 2, 2015

(54) HANDHELD ANTENNA ATTITUDE MEASURING SYSTEM

(71) Applicant: Hendrikus A. Le Sage, Sprang-Capelle (NL)

(72) Inventor: Hendrikus A. Le Sage, Sprang-Capelle (NL)

(*) Notice: Subject to any disclaimer, the term of this patent is extended or adjusted under 35 U.S.C. 154(b) by 131 days.

(21) Appl. No.: 13/969,235

(22) Filed: Aug. 16, 2013

(65) Prior Publication Data

US 2013/0328716 A1    Dec. 12, 2013

Related U.S. Application Data (63) Continuation-in-part of application No. 12/947,658, filed on Nov. 16, 2010, now abandoned, and a continuation-in-part of application No. 12/816,150, filed on Jun. 15, 2010, now Pat. No. 8,514,145.

(60) Provisional application No. 61/261,459, filed on Nov. 16, 2009, provisional application No. 61/187,129, filed on Jun. 15, 2009.

(51) Int. Cl.
*G01S 19/53* (2010.01)
*G01S 19/14* (2010.01)
*H01Q 1/12* (2006.01)
*H01Q 1/24* (2006.01)

(52) U.S. Cl.
CPC ............... *G01S 19/53* (2013.01); *G01S 19/14* (2013.01); *H01Q 1/125* (2013.01); *H01Q 1/246* (2013.01)

(58) Field of Classification Search
USPC .......... 315/33–34; 342/74, 81, 359, 350, 357, 342/357.24, 357.25, 357.36
See application file for complete search history.

(56) References Cited

U.S. PATENT DOCUMENTS

| 4,689,556 A | 8/1987 | Cedrone |
| 4,739,448 A | 4/1988 | Rowe et al. |

(Continued)

FOREIGN PATENT DOCUMENTS

| DE | 202005019697 | 3/2006 |
| EP | 0938190 | 8/1999 |

(Continued)

OTHER PUBLICATIONS

"ARINC Engineering Services, Interface Specification IS-GPS-200, Revision D", Online [retrieved on May 18, 2010]. Retrieved from the Internet;<URL: http://www.navcen.uscg.gov/pdf/IS-GPS-200D.pdf>, (Dec. 7, 2004),p. 168 para [0001].

(Continued)

*Primary Examiner* — Minh D A
(74) *Attorney, Agent, or Firm* — Law Office of Mark Brown, LLC; Mark E. Brown (57) ABSTRACT

An antenna attitude measuring system includes internal and external electrical components providing data for recording and displaying on a handheld device. The data can be transmitted to a database for access by a network operator. The antenna attitude can be adjusted for maximizing telecommunications network performance. The system includes an AISG compliant tilt sensor system mounted in-line between a telecommunications antenna enclosure and a communications cable, and positioned to measure the elevation tilt and slant of a telecommunications antenna enclosure relative to a reference axis. The system includes the ability to connect to and remotely control a plurality of remote electrical tilt control units through only a single connection.

8 Claims, 6 Drawing Sheets

(56) References Cited

U.S. PATENT DOCUMENTS

| | | | |
|---|---|---|---|
| 5,165,109 A | 11/1992 | Han et al. | |
| 5,523,761 A | 6/1996 | Gildea | |
| 5,557,656 A | 9/1996 | Ray et al. | |
| 5,604,506 A | 2/1997 | Rodal | |
| 5,864,318 A | 1/1999 | Cosenza et al. | |
| 6,252,553 B1 | 6/2001 | Solomon | |
| 6,320,898 B1 | 11/2001 | Newson et al. | |
| 6,418,031 B1 | 7/2002 | Archambeault | |
| 6,516,271 B2 | 2/2003 | Upadhyaya et al. | |
| 6,549,835 B2 | 4/2003 | Deguchi | |
| 6,774,843 B2 | 8/2004 | Takahashi | |
| 6,822,314 B2 | 11/2004 | Beasom | |
| 6,882,312 B1 * | 4/2005 | Vorobiev et al. | 342/374 |
| 6,897,328 B2 | 5/2005 | Gutsche et al. | |
| 6,897,828 B2 | 5/2005 | Boucher | |
| 6,900,992 B2 | 5/2005 | Kelly et al. | |
| 6,999,042 B2 | 2/2006 | Dearnley et al. | |
| 7,006,032 B2 | 2/2006 | King et al. | |
| 7,089,099 B2 | 8/2006 | Shostak et al. | |
| 7,224,246 B2 | 5/2007 | Thomas | |
| 7,298,325 B2 | 11/2007 | Krikorian et al. | |
| 7,315,278 B1 | 1/2008 | Bauregger et al. | |
| 8,018,390 B2 | 9/2011 | Davidson et al. | |
| 8,027,703 B2 | 9/2011 | Girard et al. | |
| 8,045,592 B2 | 10/2011 | Combi et al. | |
| 8,102,325 B2 | 1/2012 | Feller et al. | |
| 2001/0033247 A1 | 10/2001 | Singer et al. | |
| 2002/0183926 A1 | 12/2002 | Takahashi | |
| 2003/0018430 A1 | 1/2003 | Ladetto et al. | |
| 2003/0201947 A1 | 10/2003 | Boucher | |
| 2005/0174297 A1 | 8/2005 | Cake | |
| 2005/0225955 A1 | 10/2005 | Grebenkemper et al. | |
| 2007/0161348 A1 | 7/2007 | Gribben et al. | |
| 2008/0238772 A1 * | 10/2008 | Soloviev et al. | 342/357.14 |
| 2009/0141623 A1 | 6/2009 | Jung et al. | |
| 2010/0113097 A1 | 5/2010 | Seeor et al. | |
| 2010/0164833 A1 | 7/2010 | Dalmazzo | |
| 2010/0211314 A1 | 8/2010 | Zhukov | |
| 2010/0231468 A1 | 9/2010 | Ogino et al. | |

FOREIGN PATENT DOCUMENTS

| | | |
|---|---|---|
| EP | 2003731 | 12/2008 |
| WO | WO-2006056886 | 6/2006 |
| WO | WO-2007113334 | 10/2007 |
| WO | WO-2011014431 | 2/2011 |

OTHER PUBLICATIONS

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/dnss/documentation/Pegasus/tn.pdf>, (Jun. 17, 2003),p. 89 paras [0001]-[0004].

"International Preliminary Report on Patentability and Written Opinion", PCT/US2004/015678, (Nov. 21, 2006).

"International Preliminary Report on Patentability and Written Opinion", PCT/US2009/049776, (Jan. 20, 2011).

"International Preliminary Report on Patentability and Written Opinion", PCT/US2009/039686, (Oct. 21, 2010).

"International Preliminary Report on Patentability and Written Opinion", PCT/IB2010/001721, (Dec. 29, 2011).

"International Search Report and Written Opinion", PCT/IB2008/003796, (Jul. 15, 2009).

"International Search Report and Written Opinion", PCT/IB2010/001721, (Nov. 11, 2010).

"International Search Report and Written Opinion", PCT/US2008/081727, (Dec. 23, 2008).

"International Search Report and Written Opinion", PCT/US2008/088070, (Feb. 9, 2009).

"International Search Report and Written Opinion", PCT/US2009/033567, (Apr. 7, 2009).

"International Search Report and Written Opinion", PCT/US2009/033693, (Mar. 30, 2009).

"International Search Report and Written Opinion", PCT/US2009/034376, (Nov. 2, 2009).

"International Search Report and Written Opinion", PCT/US2009/039686, (May 26, 2009).

"International Search Report and Written Opinion", PCT/US2009/049776, (Aug. 11, 2009).

"International Search Report and Written Opinion", PCT/US2009/060668, (Dec. 9, 2009).

"International Search Report and Written Opinion", PCT/US2009/063594, (Jan. 11, 2010).

"International Search Report and Written Opinion", PCT/US2009/067693, (Jan. 26, 2010).

"International Search Report and Written Opinion", PCT/US2010/021334, (Mar. 12, 2010).

"International Search Report and Written Opinion", PCT/US2010/026509, (Apr. 20, 2010),1-7.

"International Search Report and Written Opinion", PCT/US2010/043094, (Sep. 17, 2010).

"International Search Report", PCT/AU2008/000002, (Feb. 28, 2008).

"ISO", 11783 Part 7 Draft Amendment 1 Annex, Paragraphs B.6 and B.7.IS0 11783-7 2004 DAM1, ISO: Mar. 8, 2004, 1-10.

"KMW Communications", *PAC (Portable Antenna Controller)*; http://www.kmwcomm.com; Retrieved from internet Jun. 8, 2009.

"Orthman Manufacturing Co., www.orthman.com/htm;guidance.htm", 2004 regarding the "Tracer Quick-Hitch".

"PAC-Manual", *KMW RF & Microwave Products—Company Confidential*, (Jul. 9, 2008).

"RFS Product Preview", *RFS Product Brochure*, (Dec. 22, 2008),1 of 1.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Irsigler, M et al., "PLL Tracking Performance in the Presence of Oscillator Phase Noise", *GPS Solutions*, vol. 5, No. 4, pp. 45-57 (2002).

Kaplan, E D., "Understanding GPS: Principles and Applications", Artech House, MA, 1996.

Keicher, R. et al., "Automatic Guidance for Agricultural Vehicles in Europe", *Computers and Electronics in Agriculture*, vol. 25, (Jan. 2000),169-194.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Papers* vol. 1, Monetrey, California American Institute of Aeronautics and Astronautics, Inc., (May 2004),136-143.

Padhi, K. et al., "An EM-coupled dual-polarized microstrip patch antenna for RFID applications", *Microwave and optical technology letter*, vol. 39, No. 5 (2003), p. 354.

Park, Chansik et al., "Integer Ambiguity Resolution for GPS Based Attitude Determination System", *SICE*, Jul. 29-31, 1998, Chiba, 1115-1120.

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995),3-50.

Rho, Hyundho et al., "Dual-Frequency GPS Precise Point Positioning with WADGPS Corrections", *ION GNSS 18th International Technical Meeting of the Satellite Division*, Sep. 13-16, 2005, Long Beach, CA, URL: http://gauss.gge.unb.ca/papers.pdf/iongnss2005.rho.wadgps.pdf,(Sep. 13, 2005),1470-1482.

(56) References Cited

OTHER PUBLICATIONS

Richter, Paul H., et al., "Improved Blind Pointing of NASA's Beam-Waveguide Antennas for Millimeter Wave Operation", *Jet Propulsion Lab Technical Report Series 1992*. Published Apr. 4, 2000.

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>., (May 8, 2006).

Smart Tool Technologies, "Low Noise, Single Axis Inclinometer Module with Digital Outputs", (May 9, 2008),p. 1-3.

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Yang, F. et al., "A single layer dual band circularly polorized micropstrip antenna for GPS application", *IEEE Antenna and Propagation Society International Symposium*, vol. 4. pp. 720-723, Jun. 2002, 720-723.

\* cited by examiner

HANDHELD ANTENNA ATTITUDE MEASURING SYSTEM

CROSS-REFERENCE TO RELATED APPLICATIONS

This application is a continuation-in-part of and claims the benefit of U.S. patent application Ser. No. 12/947,658 filed Nov. 16, 2010, which claims the benefit of U.S. Provisional Application No. 61/261,459, filed Nov. 16, 2009, and is also a continuation-in-part of U.S. patent application Ser. No. 12/816,150 filed Jun. 15, 2010, which claims the benefit of U.S. Provisional Application No. 61/187,129 filed on Jun. 15, 2009.

BACKGROUND OF THE INVENTION

1. Field of the Invention

The present invention relates generally to antenna orientation and measurements, and in particular to a system for measuring, recording, and transmitting cellular telecommunications antenna attitude data using a remote element.

2. Description of the Related Art

Telecommunication antennas require precise installation and orientation to function efficiently. The physical parameters that affect antenna performance include azimuth, elevation tilt, and slant; together they make up the attitude of an antenna. These parameters are measured manually through use of optical or electrical devices by a site technician when the antenna is installed, during site inspections, and when adjustments to the antenna's attitude are made. Antenna attitude information is important to telecommunications network operators for optimizing network performance, and to site technicians for making manual adjustment to the antenna at a site installation.

Many modern antennas contain electrical components that measure and affect antenna attitude. Such components include electrical sensors and modules that comprise the internal components of an antenna, or external components that attach to the antenna housing in a permanent or temporary manner. Internal components capable of measuring the azimuth, elevational tilt, and slant of the antenna can communicate their readings to network operators through a communications cable attached to the antenna. However, data generated by temporary external components that attach to the antenna for measuring attitude are readable by the site technician in situ but may not otherwise be independently recorded and communicated to a network operator.

Telecommunications antennas that are compliant with the industry standardized Antenna Interface Standards Group (ASIG) protocol (specifications for the control and interface of antennas with digital remote control and monitoring capabilities) and the $3^{rd}$ Generation Partnership Project (3GPP) (standard for global third generation (3G) mobile telephone system specifications) electronically communicate antenna information to network operators and enable remote control and monitoring through communications cables attached to the antennas. Such antennas consist of the antenna itself, and associated internal and external components. Current generation antennas are capable of communicating information about internal and external components such as: mechanical and electrical azimuth measurement and control; and the serial number, part number, version, firmware, production date, etc. associated with the respective internal and external components. However, current generation antennas are incapable of electronically communicating information about the antenna itself such as serial number, part number, version, firmware, production date, etc.

A significant disadvantage associated with previous antenna orientation and adjustment devices and methods involve their inability to continuously monitor antenna orientation and detect disorientation from a baseline orientation. Cellular telecommunications antennas are susceptible to physical disorientation from various causes, such as meteorological, geological, and other impact forces. For example, forces generated during a major storm may change the orientation of antenna housings on telecommunications towers and in other installations within an entire region resulting in communications performance degradation. Consequently, identification of antennas in need of reorientation, and reorientation of each affected antenna would require individualized physical attention from a technician. Therefore, an antenna orientation and adjustment system and method should not only facilitate initial orientation, but also facilitate ongoing orientation monitoring with an ability to detect conditions of disorientation, thereby requiring limited physical visits by technicians to antenna installations, and limited need for specialized equipment in order to effectuate installation and orientation of telecommunications antenna. Moreover, an antenna orientation system and method should be adaptable to existing antenna equipment permitting ease of installation and compliance with stringent regulatory requirements and approval procedures.

What is needed is a system for gathering and recording attitude data and other antenna data generated by the temporary and permanent electrical components of a telecommunications antenna, and for communicating such information to network operators. Heretofore there has not been available an antenna attitude system with the advantages and features of the present invention.

BRIEF SUMMARY OF THE INVENTION

In a handheld antenna attitude measuring system embodying the principles of the present invention, data from internal and external antenna electrical components are recorded and displayed on a handheld device, and transmitted to a database accessed by a network operator. Accumulating and displaying the data in a handheld device enables a site technician to adjust the attitude of the antenna in real time; transmission and recordation of the data to a separate database enables a network operator to utilize the antenna attitude data to maximize network performance.

BRIEF DESCRIPTION OF THE DRAWINGS

The drawings constitute a part of this specification and include exemplary embodiments of the present invention illustrating various objects and features thereof, wherein like references are generally numbered alike in the several views.

DETAILED DESCRIPTION OF THE PREFERRED EMBODIMENT

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

II. Preferred Embodiment Attitude Measuring System 2

Referring to the drawings in more detail, the reference numeral 2 generally designates a handheld antenna attitude measuring system embodying aspects of the present invention. The measuring system 2 is shown including a hand-held remote antenna monitoring device 3 connected to an antenna 4 and various external electrical devices. The antenna 4 contains internal and external electrical components for measuring antenna attitude that communicate with interface modules located within the measuring system 2. By way of example, a directional panel antenna 4 is shown and described; however, the type of antenna which may be used with the measuring system 2 may include any telecommunications antenna compatible with the Antenna Interface Standards Group (AISG) protocol. In the exemplar embodiment, the antenna 4 is pivotally mounted and releasably attached to a support 5 to enable adjustment of its attitude, and may be located at any distance above the ground.

Figure 1:
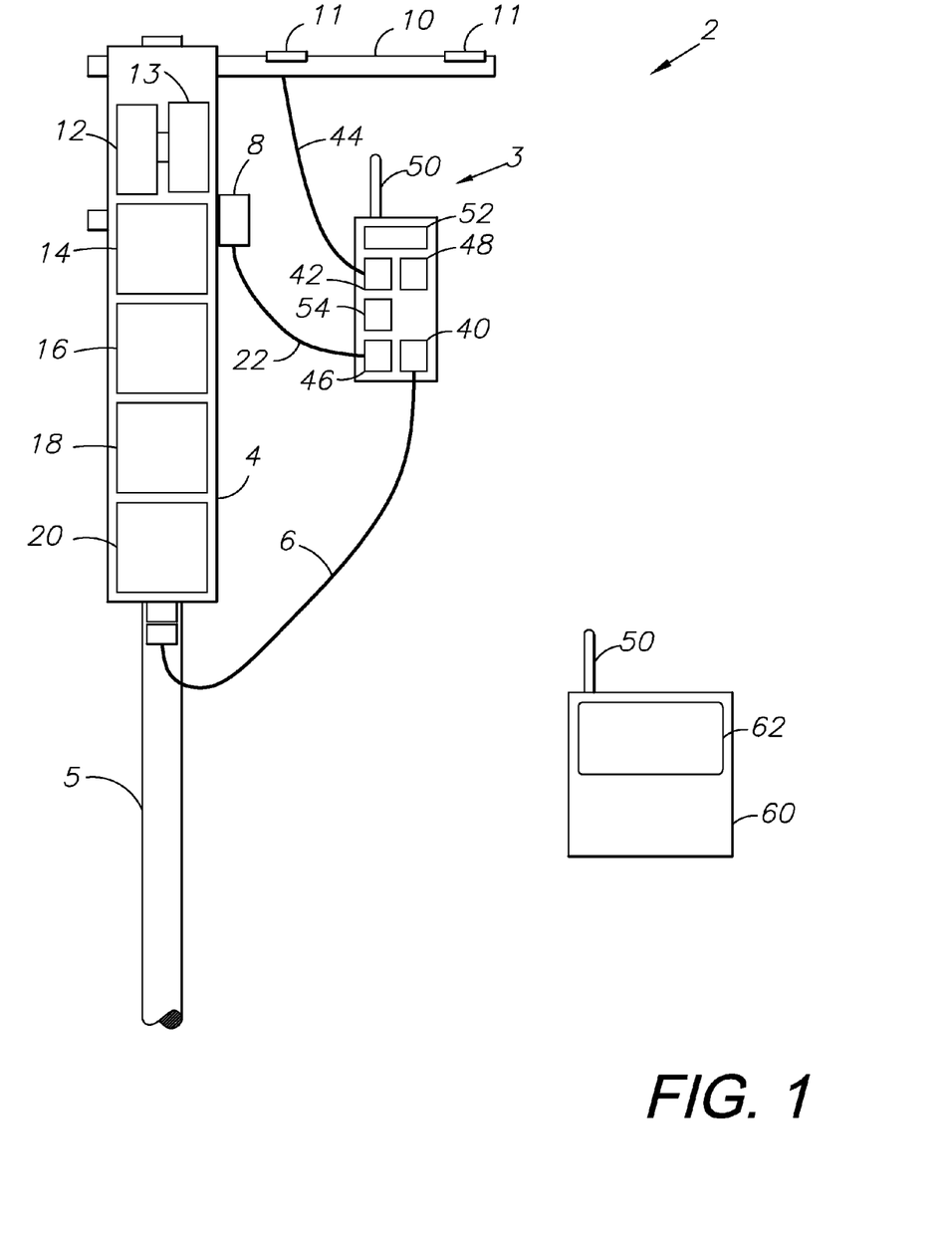
FIG. 1 is a front elevational view of a handheld antenna measuring system connected to internal and external antenna sensors and modules in accordance with an embodiment of the present invention.

Referring to FIG. 1, the antenna 4 has internal electrical components, such as remote electrical tilt (RET) 12, an RET control unit 13 (RCU), beam control 14, azimuth control 16, and a tilt sensor 18, that either control or monitor functions of the antenna 4. Data generated by the aforementioned components is electrically transmitted between the antenna 4 and measuring system 2 along a communications cable 6 by an AISG antenna interface 20 located within the antenna 4, and an AISG handheld interface 40 located within the measuring system 2. External electrical components such as a Global Positioning System (GPS) azimuth system 10 having Global Navigation Satellite System (GNSS) components 11, including at least one GNSS receiver and one GNSS antenna, for receiving position data from GPS satellites can be releasably attached to the exterior of the telecommunications antenna 4 for measuring direction and attitude of the antenna 4 using well-known GNSS position calculation technology. The GNSS azimuth system 10 is connected to, and communicates with, a GPS azimuth module 42 located within the measuring system 2 through a communications cable 44.

Figure 2:
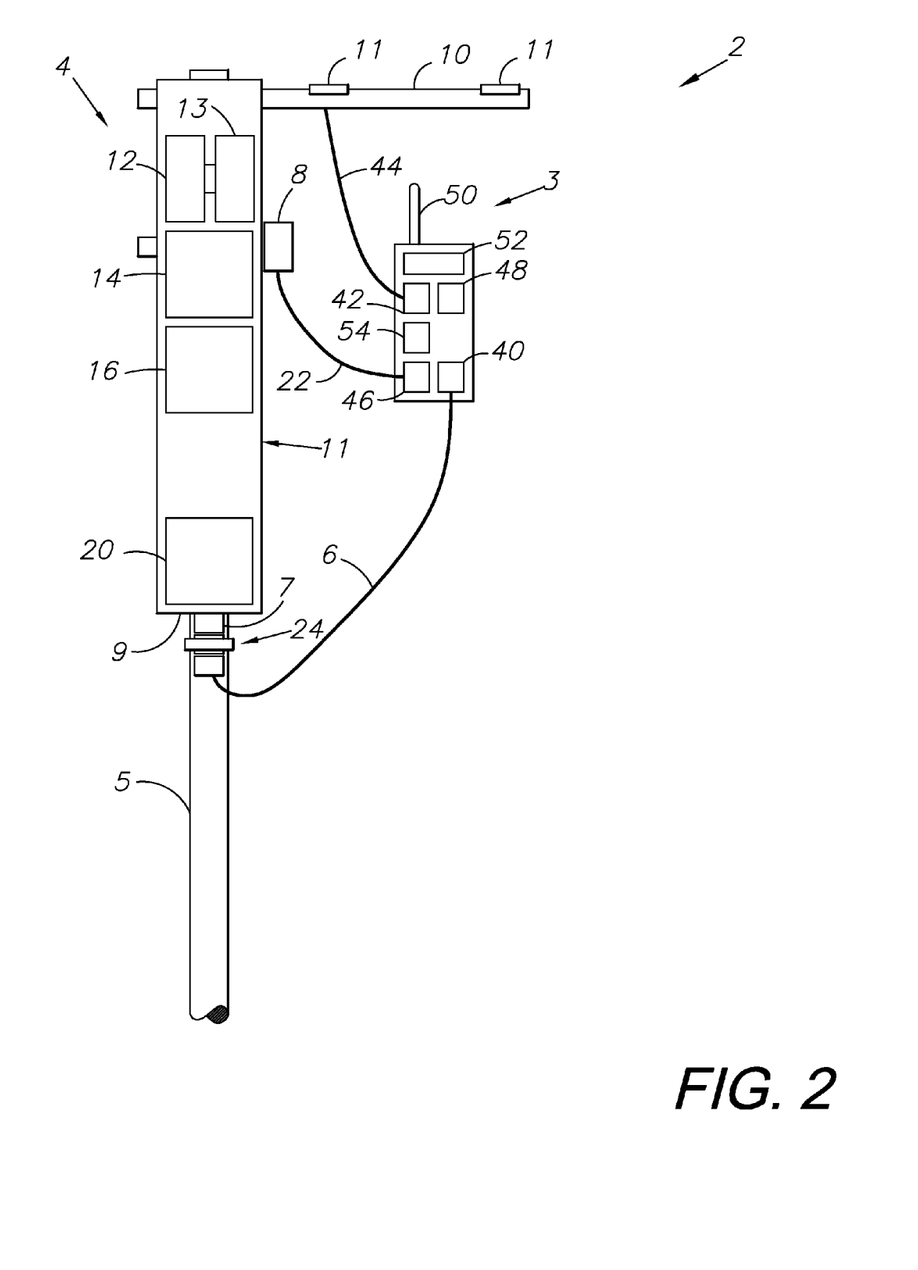
FIG. 2 is an alternative embodiment handheld antenna measuring system in accordance with the present invention.

For situations where an antenna does not have an internal tilt sensor 18, an external tilt sensor 8 can be temporarily and releasably mounted, or permanently mounted to the exterior of the antenna 4. An external tilt sensor 8 is connected to, and communicates with a remote tilt sensor module 46 located within the measuring system 2 through a communications cable 22. Alternatively, an AISG compliant in-line tilt sensor 24 can be installed between the antenna 4 and the communications cable 6 (FIG. 2) for transmitting data to the measuring system 2. The measuring system 2 is a modular system, and one skilled in the art will understand it can be expanded to incorporate additional modules for communication with additional electrical components that may be used by a site technician when installing an antenna 4 or when making adjustments to the attitude of the antenna 4.

The measuring system 2 is a handheld, portable electrical device that gathers the antenna attitude data from the internal and external electrical components and stores the data in memory in an encrypted file format. A display 52 graphically represents values from the data generated by the electrical components permitting a site technician to assess the current attitude of the antenna 4 and make adjustments to the orientation of the antenna 4 to optimize network performance. The system 2 uses a communications module 48 to interface with a wired connection, or a wireless connection via an antenna 50 to transmit the data from the system 2 to a computing device 60 having an antenna 50 and a display 62 including, but not limited to, a personal computing device, laptop, personal digital assistant or smart phone. A wireless communications module 54 enables the measuring system 2 to communicate with a database over a mobile telephone system to upload the data received from the electrical components in real time for access by network operators for analysis and interpretation.

It will be appreciated that the components of the measuring system 2 are AISG and Third Generation Partnership Project (3GPP) compliant, and can be used for various other applications. Moreover, the measuring system 2 can be fabricated in various sizes and from a wide range of suitable materials, using various manufacturing and fabrication techniques.

Figure 3:
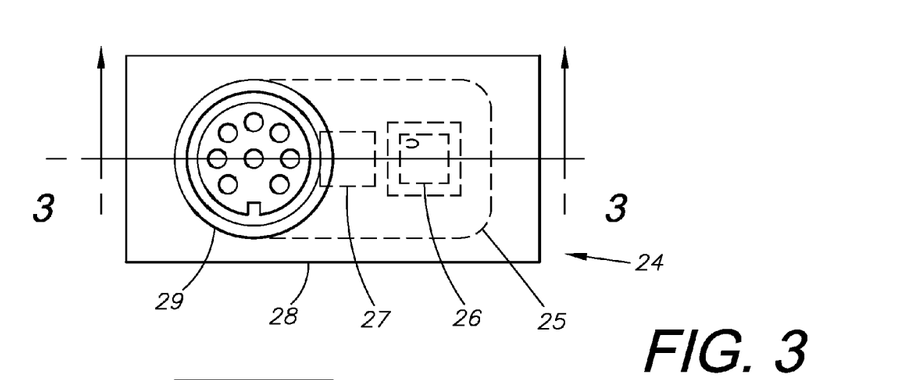
FIG. 3 is a top plan view showing in part the female connector of an in-line tilt sensor system in accordance with an embodiment of the present invention.
Figure 4:
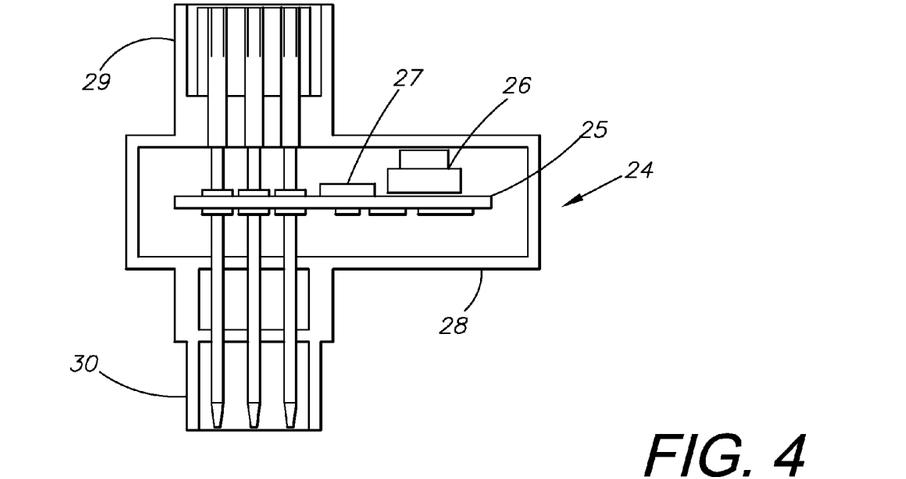
FIG. 4 is a sectional view of the in-line tilt sensor system taken generally along line 3 in FIG. 3.
Figure 5:
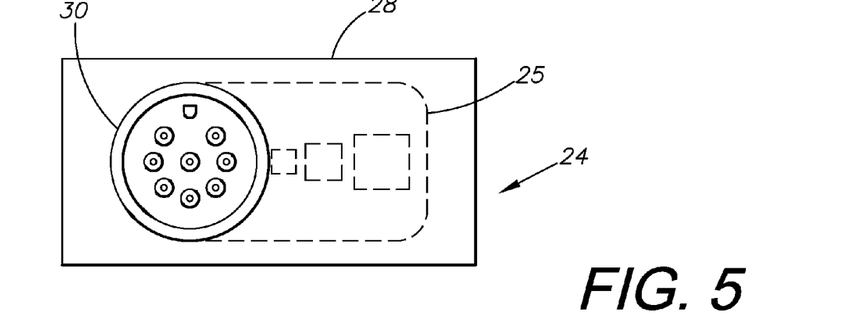
FIG. 5 is a bottom plan view showing in part the male connector of an in-line tilt sensor system in accordance with an embodiment of the present invention.

Referring to FIGS. 3-5, the in-line directional sensor 24 is shown mounted beneath the antenna 4 perpendicular to the bottom plate 9, and in-line between the bulkhead connector 7 and an eight-pin AISG compliant communications cable 6. The directional sensor 24 consists of a weatherproof housing 28 encasing a printed circuit board (PCB) 25, and first 29 and second 30 eight-pin AISG compliant connectors positioned at 90 degree angles relative to the PCB 25. In this preferred embodiment, the first connector 29 is represented by a "female" type connector, and the second connector 30 is represented by a "male" type connector, however, it is appreciated by those skilled in the art that different combinations of connector types can be used to connect the directional sensor 24 to respective devices.

A tilt sensor 26 capable of measuring tilt and slant is mounted parallel with the surface of a PCB 25 containing a microprocessor 27, and related circuitry. The tilt sensor 26 is an electrical or electrical-mechanical device, such device may include, without limitation, an inclinometer, a dual axis accelerometer of the type manufactured by Memsic, Inc. of Andover Mass., or preferably, a dual axis digital inclinometer/accelerometer such as the type manufactured by Analog Devices, Inc. of Norwood Mass. The related circuitry consists of an RS485 driver, and a power supply.

Because the PCB 25 is perpendicular to the connectors 29, 30, the tilt sensor 26 is parallel with the bottom plate 9 and thereby capable of measuring the tilt and slant of the front plate 11 in relation to a reference axis. The microprocessor 27 and the related circuitry enable the tilt sensor 26 to communicate alignment of the antenna 4 to the network operator through a communications cable connected to the antenna 4 through an AISG protocol, or wirelessly through the antenna 50 located on the remote tilt control device 3.

III. Alternative Embodiment Sensor System 102

Figure 6:
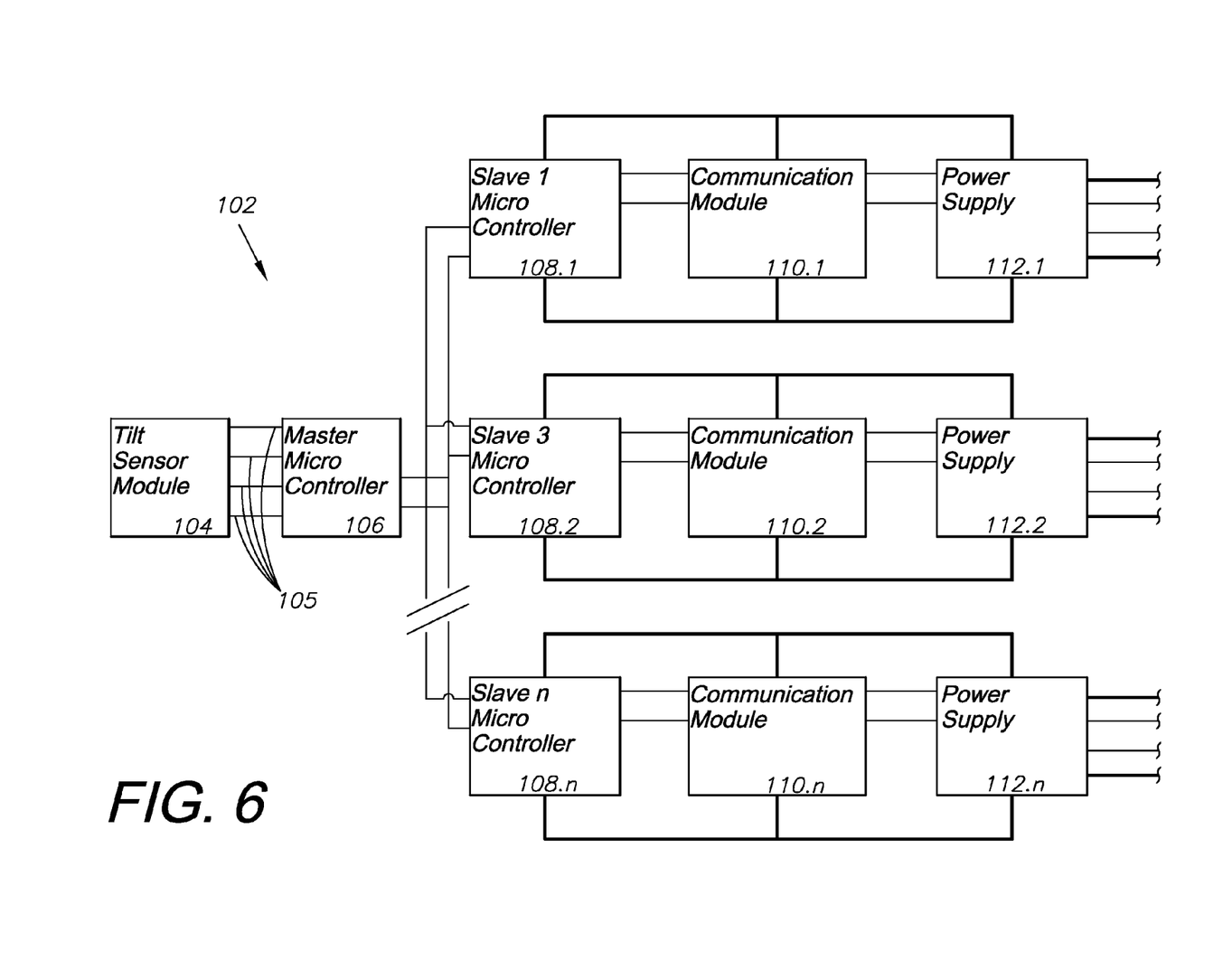
FIG. 6 is a schematic view of an alternative embodiment in-line tilt sensor system in accordance with an embodiment of the present invention wherein multiple antenna protocols are orientated and monitored by a single tilt sensor.
Figure 7:
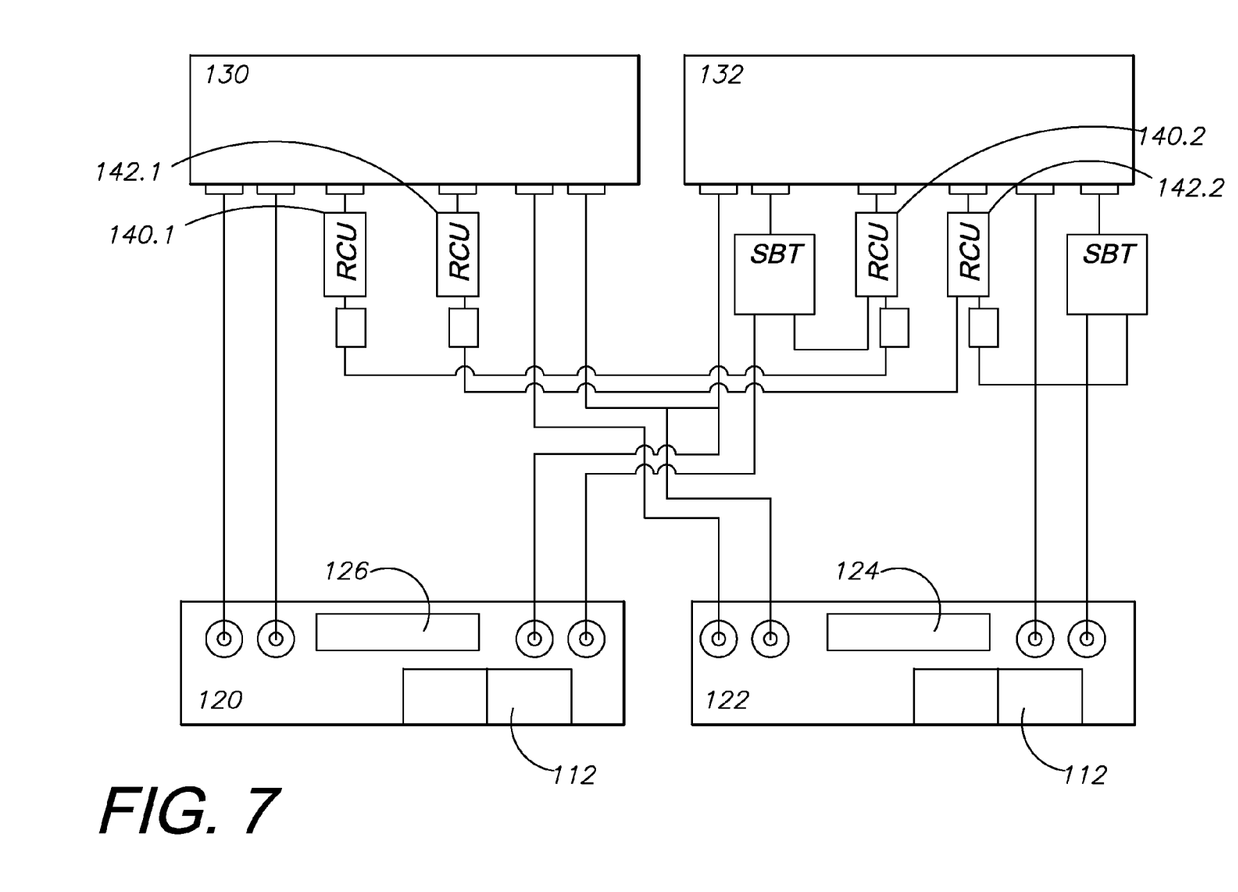
FIG. 7 is a schematic view of the embodiment of FIGS. 1-5 of an in-line tilt sensor system using multiple tilt sensors to orient and monitor multiple antenna protocols.
Figure 8:
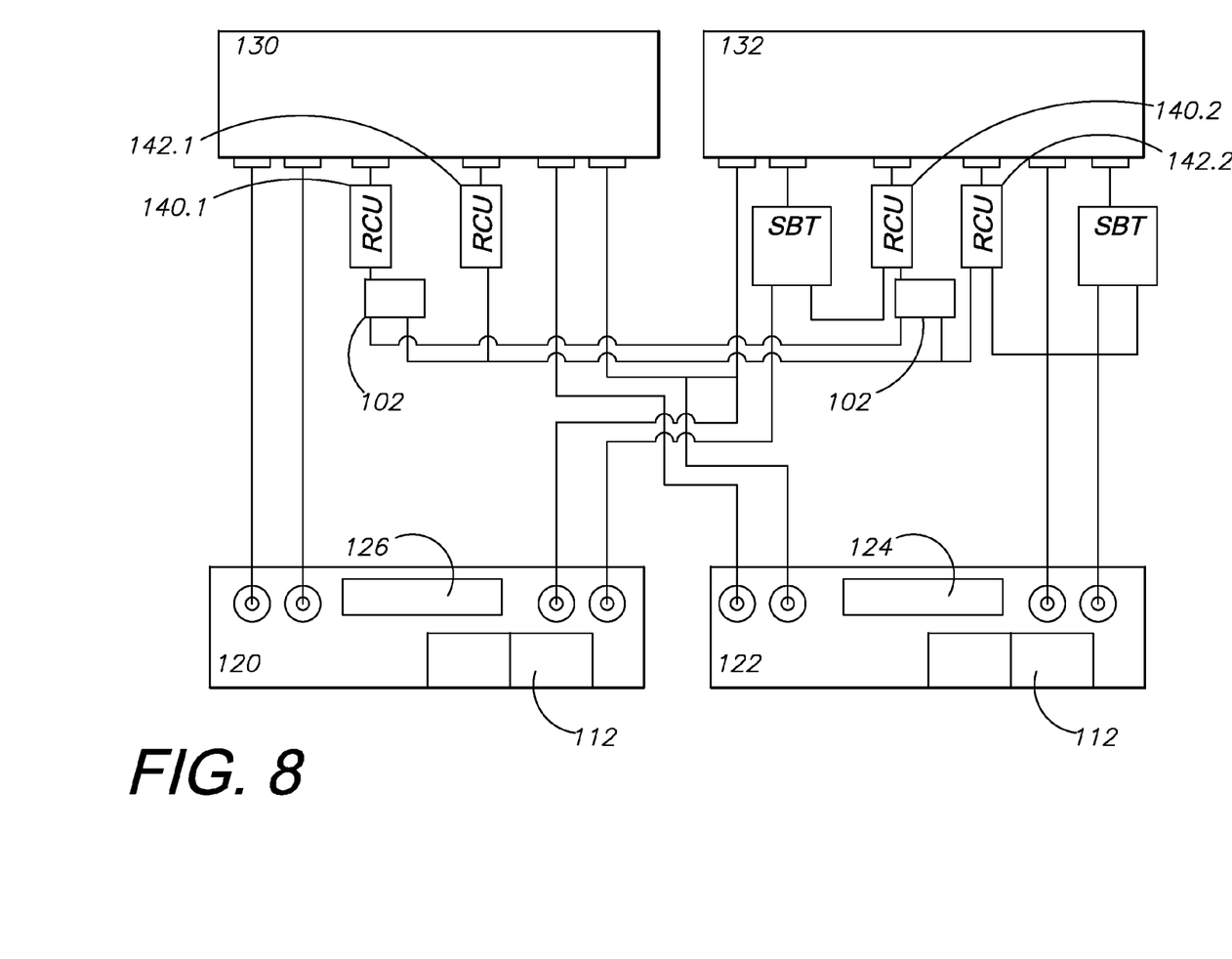
FIG. 8 is a schematic view of the alternative embodiment of FIG. 6 of an in-line tilt sensor system using a single tilt sensor to orient and monitor multiple antenna protocols.

An antenna identification system 102 comprising yet another embodiment or aspect of the present invention is shown in FIGS. 6-8. The previously disclosed embodiments are capable of providing orientation and monitoring service for a single antenna of a single frequency band. In this alternative embodiment, a single inline antenna identification module 104 is capable of monitoring and reporting on an unlimited number of communication ports on an unlimited number of antenna protocols.

The alternative embodiment sensor system 102 is a solution for cellular network carriers which utilize multi-band antennas operating on one or more frequency bands. It is important for the network provider or carrier to know the mechanical tilt and roll of all directional antennas in the network. This is made complicated by multi-band antennas with multiple remote control units (RCUs). The multi-band antenna may have one or more RCUs for every frequency band in use.

Each RCU can be controlled by one or more primary controllers (CCU). Such CCU controllers may be installed as a module inside a BTS station, but must also be part of the BTS or antenna transceiver. Identification data can be accessed by either running control cables up the mast or other structure a multi-band antenna is mounted to, or by combining the control signals with the transmitted radio signals over an antenna feeder cable. In this way, the data flow stems from the individual CCU, thus forming separate systems.

The tilt sensor module 104 provides multiple individual communication ports 105 for multiple communication protocols. The tilt sensor module 104 shares its detected information over the multiple communication ports 105. The tilt sensor module 104 feeds into a master micro controller 106, which in turn communications with an unlimited number of slave micro controllers 108, at least one for each communication protocol. These slave controllers 108.1, 108.2, 108.n in turn control the slave communications modules 110.1, 110.2, 110.n, power supplies 112.1, 112.2, 112.n, and other components located in each protocol. Because each protocol contains a separate power supply 112, each protocol will respond as an individual device.

The tilt sensor module 104, as described in the previous embodiments, may be a one, two, or three axis accelerometer. The module 104 can communicate its readings across the communication ports 105 to the master controller 106, which then handles each of the unlimited number of slave protocol systems. This allows a single tilt sensor module 104 to capably orient and monitor a multi-band antenna no matter the number of protocols used by that antenna or the number of independent antenna motors or busses are included in the multi-band antenna.

FIGS. 7 and 8 together show the difference between the present alternative embodiment and employing the previous embodiment within a multi-frequency antenna system. Two separate transceivers, a high-frequency transceiver 122 and a low frequency transceiver 120, displaying a high frequency signal 124 and a low frequency signal 126, are connected to two antenna bodies 130, 132. FIG. 11 displays a separate low frequency tilt sensor system 136 and a high frequency tilt sensor system 138. Each are connected to the separate low-band RCU 140.1, 140.2 and the high-band RCU 142.1, 142.2, respectively FIG. 8 displays the present alternative embodiment employed on a multi-frequency antenna system. The single tilt sensor system 102 is communicatively connected to both the low-band RCU 140.1, 140.2 and the high-band RCU 142.1, 142.2. This allows the single tilt sensor system to send communication signals to each individual RCU, and each RCU controls its separate frequency as an isolated system.

It is to be understood that while certain aspects of the invention have been shown and described, the invention is not limited thereto and encompasses various other embodiments and aspects.

The invention claimed is:

1. A system for measuring attitude of a multi-band frequency telecommunications antenna, which system includes:
    a telecommunications antenna having at least two remote electrical tilt (RET) remote control units (RCUs) each associated with one of the multi-band frequencies, a beam control component, and an azimuth control component;
    an antenna enclosure enclosing said telecommunications antenna, said enclosure comprising a bottom plate, a front plate, and a bulkhead connector;
    a directional sensor comprising a printed circuit board (PCB), microprocessor, and first and second connector connected to said PCB, a multi-axis tilt sensor having multiple individual communication ports adapted for measuring tilt and slant of a telecommunications antenna, and a weatherproof housing;
    said directional sensor mounted to said antenna enclosure in-line with said bulkhead connector and perpendicular to said antenna bottom plate;
    one of said tilt sensor communication ports connected to each of said at least two RCUs;
    a handheld attitude measuring device connected to said second connector of said directional sensor via a communications cable;
    said attitude measuring device including an output component adapted for providing output corresponding to the attitude of said telecommunications antenna, as measured by said directional sensor, via wireless communication to a remote location;
    said attitude measuring device further including a user interface adapted for reporting directional data obtained by said directional sensor to the user; and
    said attitude measuring device adapted to send alignment instructions to said at least two RCUs based upon said directional data.

2. The system of claim 1, further comprising:
    a global navigation satellite system (GNSS) component including a GNSS receiver and a GNSS antenna;
    said GNSS component mounted to said front plate of said telecommunications antenna; and
    said GNSS receiver being connected to said handheld attitude measuring device and adapted for providing GNSS-based position data of said telecommunications antenna.

3. The system of claim 1, wherein said external tilt sensor is connected to and in communication with said external telecommunications antenna attitude measuring device through a communications cable.

4. The system of claim 1, wherein said directional sensor is an AISG compliant in-line tilt sensor connected to and in communication with said external telecommunications antenna attitude measuring device.

5. A method for detecting the alignment of a multi-band frequency telecommunications antenna including a bulkhead connector, the method comprising the steps:
   providing a single directional sensor system comprising a printed circuit board (PCB), a microprocessor, a first and second connector connected to said PCB, a multi-axis tilt sensor having multiple individual communication ports adapted for measuring tilt and slant of a telecommunications antenna and a weatherproof housing;
   providing said telecommunications antenna with multiple remote electrical tilt (RET) remote control units (RCUs) each associated with one of the multi-band frequencies;
   connecting one of said tilt sensor communication ports to each of said at least two RCUs;
   providing a handheld attitude measuring device connected to said second connector of said directional sensor via a communications cable, said handheld attitude measuring device including a user interface adapted for reporting directional data obtained by said directional sensor system to the user;
   mounting the directional sensor system in-line with said bulkhead connector and perpendicular to the antenna;
   obtaining directional data associated with the telecommunications antenna with said directional sensor system via said handheld attitude measuring device;
   determining the proper aiming direction for the communications beam;
   comparing the obtained directional antenna data with the determined proper aiming direction;
   inputting alignment instructions into said handheld attitude measuring device, thereby aligning said telecommunications antenna with the determined proper aiming direction;
   providing the measured tilt and slant from the single directional sensor system to each respective RCU; and
   controlling the alignment of the antenna based on the measured tilt and slant and the respective frequency.

6. The method of claim 5, further comprising the steps:
   providing a global navigation satellite system (GNSS) component including a GNSS receiver and a GNSS antenna;
   mounting said GNSS component to a front plate of said telecommunications antenna; and
   connecting said GNSS receiver to said handheld attitude measuring device, said GNSS receiver adapted for providing GNSS-based position data of said telecommunications antenna.

7. The method of claim 5, wherein said external tilt sensor is connected to and in communication with said external telecommunications antenna attitude measuring device through a communications cable.

8. The method of claim 5, wherein said directional sensor is an AISG compliant in-line tilt sensor connected to and in communication with said external telecommunications antenna attitude measuring device.

* * * * *